United States Patent [19]

Gries

[11] Patent Number: 4,936,526
[45] Date of Patent: Jun. 26, 1990

[54] FOLDABLE COUNTER-ROTATING PROPFAN BLADES

[75] Inventor: Donald A. Gries, Walled Lake, Mich.

[73] Assignee: Williams International Corporation, Walled Lake, Mich.

[21] Appl. No.: 305,164

[22] Filed: Feb. 2, 1989

[51] Int. Cl.$^5$ .............................................. B64C 11/46
[52] U.S. Cl. ...................................... 244/69; 416/129; 416/142; 60/268; 244/53 R
[58] Field of Search .................... 244/60, 53 R, 65; 416/124, 125, 126, 127, 128, 129, 142, 143; 60/226.1, 268

[56] References Cited

U.S. PATENT DOCUMENTS

| | | | |
|---|---|---|---|
| 2,478,206 | 8/1949 | Redding | 60/226.1 |
| 2,955,656 | 10/1960 | Balje et al. | 416/142 |
| 3,811,791 | 5/1974 | Cotton | 244/69 |
| 3,957,229 | 5/1976 | Davis | 244/53 R |

FOREIGN PATENT DOCUMENTS

| | | | |
|---|---|---|---|
| 136635 | 11/1947 | Australia | 416/142 |
| 1004208 | 3/1952 | France | 416/142 |

Primary Examiner—Joseph F. Peters, Jr.
Assistant Examiner—Anne Sartelle
Attorney, Agent, or Firm—Lyman R. Lyon

[57] ABSTRACT

An unducted turbofan engine comprises first and second fan blades journaled for rotation from a folded position substantially parallel to the axis of rotation of the engine to a radially orientated propulsion condition. A releasable shroud normally retains the fan blades in the folded condition and releases the fan blades in a controlled sequence.

2 Claims, 2 Drawing Sheets

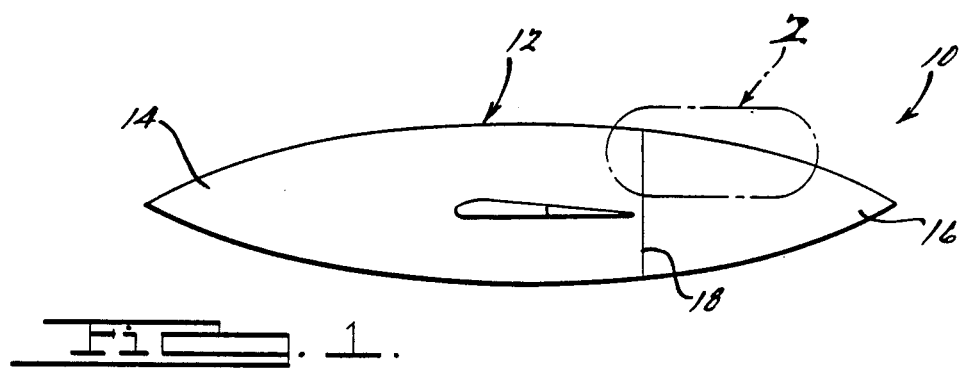
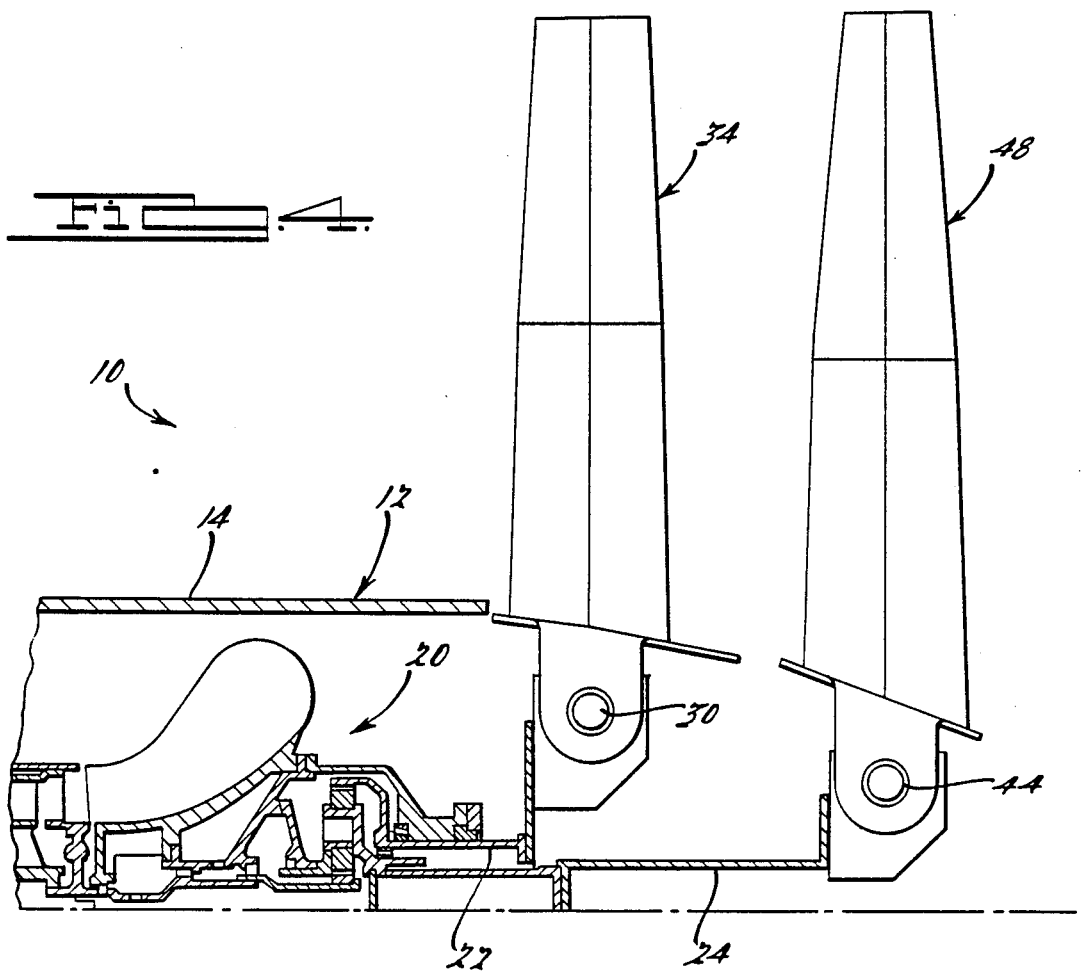

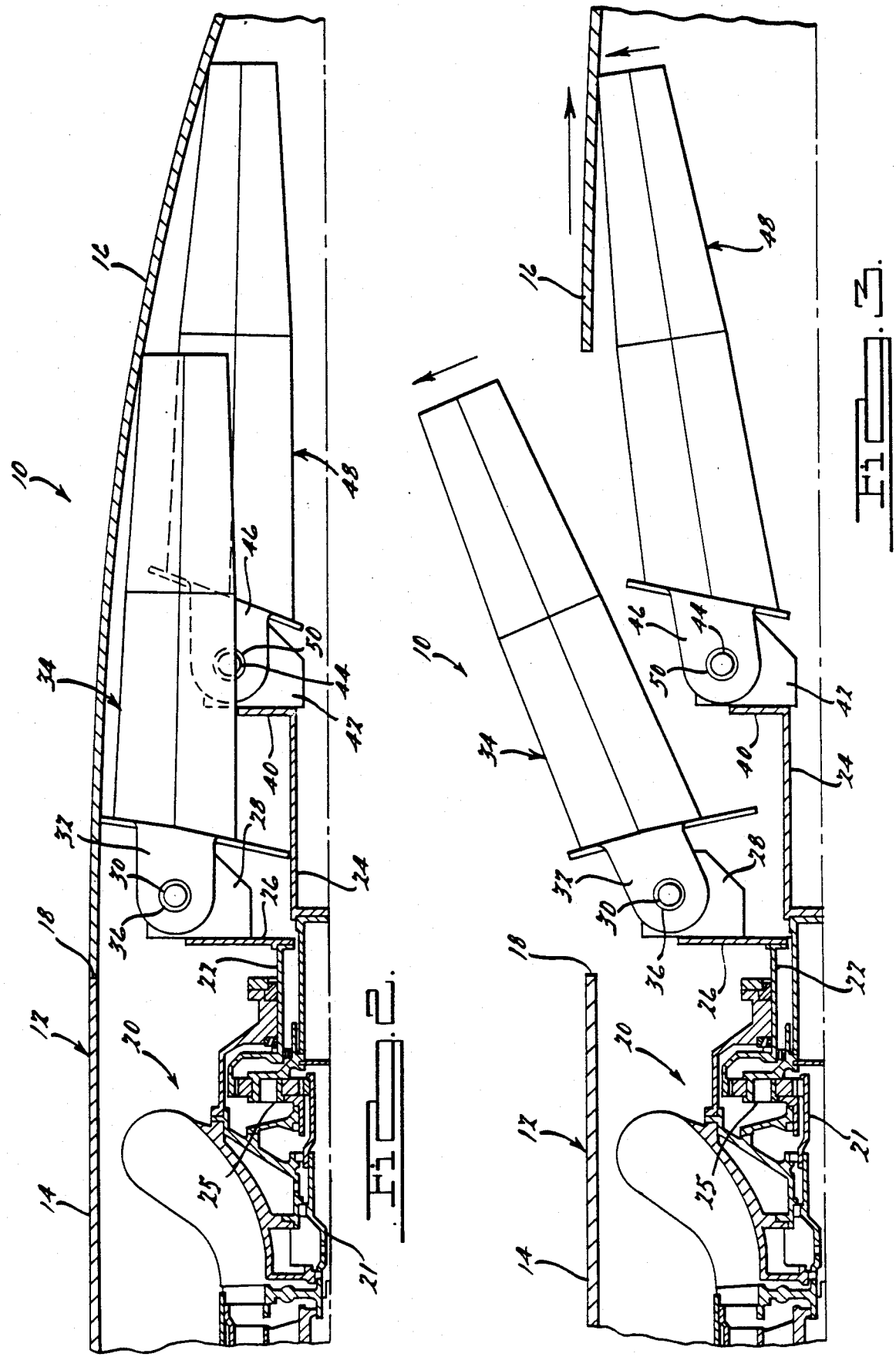

FOLDABLE COUNTER-ROTATING PROPFAN BLADES

BACKGROUND OF THE INVENTION

The instant invention relates to propfan propulsion systems. More specifically, the invention relates to a propfan propulsion system on a small cruise missile utilizing two counter-rotating foldable blades.

Theoretical studies and test data indicate that propfan engines may improve fuel efficiency by 15–30%. However, for small missile applications, the propeller has an effective diameter much larger than that of the missile, making propfan powered missiles difficult to store and launch. A design is needed for a propeller blade which can be folded for storage and launching, and deployed for propulsion once airborne. Moreover, it is desirable to have two counter-rotating sets of blades to further increase fuel efficiency. Unfortunately, it is difficult to deploy the blades of counter-rotating hubs because the blades of one hub may interfere with the blades of another if the hubs begin to rotate during deployment.

The prior art teaches a propfan utilizing foldable blades which can be deployed for propulsion means upon operator command, as shown in U.S. Pat. No. 3,957,229, issued on May 18, 1976 to Davis. More specifically, Davis teaches blades which are hinged onto an annular hub and deployed via centrifugal force when the hub begins to rotate. The blades are spring biased towards the folded position. Thus, if the hub is held motionless, the blades will not deploy. Unfortunately, although the blades taught by Davis can be folded against a missile housing, missiles utilizing such blades would still be difficult to store and launch because the blades are exposed. In addition, since Davis teaches one hub and set of blades, he fails to teach a means for preventing interference between the blades of different hubs during deployment.

The prior art teaches a means for covering foldable projections during storage and launch. For example, in U.S. Pat. No. 4,565,340, issued Jan. 21, 1986, Baines teaches a projectile having guidance fins which are held in an axial position by an external casing until the projectile is launched from the casing, whereupon the blades spring out to a radially extended position. Nonetheless, since Baines is not concerned with using the guidance fins for propulsion, he also fails to teach a means for preventing interference between the blades of different hubs during deployment.

The prior art also teaches propfan propulsion systems using two counter-rotating blades, as shown, for example, in British Patent No. 601,170, issued Apr. 29, 1948 to Smith. However, Smith teaches permanently deployed blades such as those which might be used on a larger aircraft. Thus Smith is not faced with, nor does he offer a solution to, the problem of interference between the blades of different hubs during deployment.

SUMMARY OF THE INVENTION

The object of this invention is a propfan propulsion system comprising counter-rotating propellor hubs with propeller blades attached thereto which can be folded for ease of storage and launch, and deployed without interference between the blades of different hubs.

The propfan propulsion system of the instant invention comprises a turbine engine with a rotating output shaft extending therefrom. Counter-rotating annular hubs are driven by the output shaft through a planetary gearing system. A plurality of blade support flanges are attached at their bases to the perimeter of each hub. A propeller blade is pivotally supported by each flanges for movement from an axially rearwardly extending folded position to a radially extending propulsion position. Each blade is biased towards the propulsion position by a coil spring.

The blades are held in the folded position by a rearwardly releasable enclosure. As the enclosure is released, the springs cause each blade to pivot into the deployed position. Because the enclosure releases rearwardly, the blades attached to the forward hub are released first, deploying before any interference with the blades attached to the rearward hub can take place.

BRIEF DESCRIPTION OF THE DRAWINGS

FIG. 1 shows a turbofan with its fan blades encapsulated by a disposable fairing.

FIG. 2 is a fragmentary sectional view taken within the circle 2 of FIG. 1 showing the engine with its fan blades folded, FIG. 3 shows the missile after launch with the fairing partially jettisoned and the blades partially extended, and FIG. 4 shows the missile with the fan blades extended for propulsion.

DETAILED DESCRIPTION OF THE PREFERRED EMBODIMENT OF THE INVENTION

As seen in FIG. 1 of the drawings a cruise missile 10 comprises an elongated generally cylindrical enclosure 12 of tear drop configuration defined by pointed frontal and rear sections 14 and 16, respectively. The front and rear sections 14 and 16, are separable along a transverse line 18 thereof.

As seen in FIG. 2 of the drawings, the missile 10 is provided with a conventional turbine engine generally designated by the numeral 20. Power is taken off the engine 20 through a shaft 21 to a pair of coaxial oppositely rotating cylindrical drive tubes, 22 and 24 through a planetary gear system 25. The radially outer drive tube 22 has a radially and circumferentially extending annular flange 26 for the support of a plurality of axially extending blade support flanges 28, one of which is shown in FIG. 2 of the drawings. The blade support flange 28 has a pin 30 extending therethrough which is journaled in an end portion 32 of a forward fan blade 34. The fan blade 34 is spring loaded to the radially extended or propulsion condition as by a coil spring 36 disposed about the pin 30.

Similarly, the radially inner drive tube 24 has a circumferentially extending radial flange 40 with an axially extending blade support flange 42 thereon, for the support of a rear blade pin 44. The pin 44 extends through a complementary journal in an end portion 46 of a rear fan blade 48. A coil spring 50 normally biases the blade 48 to the erect condition. The blades 34 and 48 are circumferentially staggered to permit overlapping thereof, as seen in FIG. 2.

In accordance with the present invention the rearwardly orientated portion 16 of the cruise missile enclosure 12 mechanically restrains the blades 34 and 48 in the folded condition against the bias of the springs 36 and 50. Thus, in order to effect erection of the fan blades 34 and 48, the rear enclosure 16 need only be ejected rearwardly thereby properly sequencing erection of the blade 34 prior to erection of the blade 48.

From the foregoing description it should be apparent that the cruise missile 10 exhibits a relatively small frontal cross section due to folding of the blades 34 and 48. Moreover, erection of the blades 34 and 48 is accomplished by the simple expedient of ejecting the enclosure therefor, such ejection automatically sequencing erection of the propulsion blades 34 and 48.

While the preferred embodiment of the invention has been disclosed, it should be appreciated that the invention is susceptible of modification without departing from the scope of the following claims.

I claim:

1. In an unducted turbofan engine comprising a turbine engine having first and second rearwardly extending counter-rotating coaxial output shafts, the improvement comprising
    a first foldable fan blade journaled on said first output shaft for rotation from a folded position substantially parallel to the axis of rotation of said engine output shafts to a radially orientated propulsion condition;
    a second foldable fan blade spaced axially rearwardly from said first fan blade and journaled on said second output shaft for rotation from a folded position substantially parallel to the axis of rotation of said engine output shafts to a radially orientated propulsion condition; and
    a shroud normally enclosing and retaining said first and second fan blades in the folded condition, said shroud being movable parallel to the rotational axis of said engine output shafts to first release said first fan blade for movement to the propulsion condition and thereafter release said second fan blade for movement to the propulsion condition.

2. An unducted turbofan engine in accordance with claim 1 comprising means normally biasing said fan blades against said shroud and toward the radially extended propulsion condition.

* * * * *